(12) United States Patent
Chou et al.

(10) Patent No.: US 10,503,857 B2
(45) Date of Patent: Dec. 10, 2019

(54) COMPUTER EXECUTING METHOD, CLOCK DATA PROCESSING SYSTEM AND COMPUTER READABLE STORAGE MEDIUM

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Yih-Chih Chou, Hsinchu (TW); Cheng-Hong Tsai, Hsinchu (TW); Chih-Mou Tseng, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 113 days.

(21) Appl. No.: 15/956,757

(22) Filed: Apr. 19, 2018

(65) Prior Publication Data

US 2019/0251211 A1    Aug. 15, 2019

(30) Foreign Application Priority Data

Feb. 12, 2018    (CN) .......................... 2018 1 0143889

(51) Int. Cl.
*G06F 17/50*    (2006.01)
(52) U.S. Cl.
CPC ........ *G06F 17/505* (2013.01); *G06F 17/5031* (2013.01); *G06F 17/5068* (2013.01);
(Continued)

(58) Field of Classification Search
None
See application file for complete search history.

(56) References Cited

U.S. PATENT DOCUMENTS 5,557,779 A * 9/1996 Minami .................... G06F 1/10
716/114
7,752,588 B2 * 7/2010 Bose ................... G06F 17/5072
716/122

(Continued)

OTHER PUBLICATIONS

P. Saxena et al., "Modeling Repeaters Explicitly Within Analytical Placement," ACM/DAC 2004, pp. 699-704. (Year: 2004).*

(Continued)

*Primary Examiner* — Leigh M Garbowski
(74) *Attorney, Agent, or Firm* — CKC & Partners Co., LLC

(57) ABSTRACT

A computer executing method is provided in this disclosure. The computer executing method is configured for synthesizing a clock tree circuit, the clock tree circuit includes a plurality of clock pins, a plurality of weight values are set between any of the clock pins, the computer executing method includes steps of: establishing a graph model; utilizing a force directed algorithm to calculate a branch position according to the weight values and a position of the clock pins; setting a guide buffer in the branch position and updating a netlist; performing a clock tree synthesis (CTS) and executing a post-CTS static timing analysis (STA); determining whether an analysis result of the post-CTS STA and a timing setup value is identical or not; and if the analysis result does not match the timing setup value, re-establishing a graph model.

20 Claims, 8 Drawing Sheets

(52) U.S. Cl.
CPC ...... *G06F 17/5072* (2013.01); *G06F 17/5081* (2013.01); *G06F 2217/06* (2013.01); *G06F 2217/84* (2013.01)

(56) References Cited

U.S. PATENT DOCUMENTS 8,966,425 B1* 2/2015 Eisenstadt ........... G06F 17/5077
716/120
9,552,454 B2* 1/2017 Chowdhury .............. G06F 1/10

OTHER PUBLICATIONS

L. Luo et al., "A Fast and Stable Force-Directed Placement with Implicit Buffer Planning," 2005 IEEE, pp. 760-763. (Year: 2005).*
A. Rajaram et al., "Robust Chip-Level Clock Tree Synthesis for SOC Designs," ACM/DAC 2008, pp. 720-723. (Year: 2008).*
A. Rajaram et al., "Robust Chip-Level Clock Tree Synthesis," IEEE Trans. on Computer-Aided Design of Integrated Circuits and Systems, vol. 30, No. 6, Jun. 2011, pp. 877-890. (Year: 2011).*
T.-B. Chan et al., "OCV-Aware Top-Level Clock Tree Optimization," ACM GLSVLSI'14, May 21-23, 2014, pp. 33-38. (Year: 2014 ).*
T.-J. Wang et al., "Top-Level Activity-Driven Clock Tree Synthesis with Clock Skew Variation Considered," 2016 IEEE Int'l Symposium on Circuits and Systems, p. 2591-2594. (Year: 2016).*

* cited by examiner

600

COMPUTER EXECUTING METHOD, CLOCK DATA PROCESSING SYSTEM AND COMPUTER READABLE STORAGE MEDIUM

RELATED APPLICATION

This application claims priority to China Application Serial Number 201810143889.7, filed Feb. 12, 2018, the entirety of which is herein incorporated by reference.

BACKGROUND

Field of Invention

The present application relates to a computer executing method, a clock data processing system and a computer readable storage medium. More particularly, the present application relates to a computer executing method, a clock data processing system and a computer readable storage medium for reduction of on-chip-variation.

Description of Related Art

Recently, as technology advances make it possible to integrate hundreds of millions of transistors onto a single semiconductor chip. This dramatic increase in semiconductor integration densities has made it considerably more on-chip-variation (OCV). Especially when the clock tree is synthesized, it may have a great influence on the chip due to the timing variation. Therefore, how to solve the problem of reducing the on-chip-variation in the clock tree is one of the problems to be improved in the field.

SUMMARY

An aspect of the disclosure is to provide a computer executing method. The computer executing method is configured for calculating a branch position of a clock tree, the clock tree comprises a plurality of clock pins, a plurality of weight values are set between any of the clock pins, the computer executing method includes operations of: establishing a graph model, wherein the graph model comprises a plurality of nodes and a plurality of edges, the nodes are corresponded to the clock pins and the edges are corresponded to the weight values; utilizing a force directed algorithm to calculate a branch position according to the weight values and a position of the clock pins; setting a guide buffer in the branch position and updating a netlist; performing a clock tree synthesis (CTS) and executing a post-CTS static timing analysis (STA); determining whether an analysis result of the post-CTS STA meets the setup time constraint or not; and if the analysis result does not meet the setup time constraint, re-calculating the weight values, and re-establishing a graph model according to the weight values.

Another aspect of the disclosure is to provide a clock data processing system. The clock data processing system is configured for calculating a branch position of a clock tree, the clock tree comprises a plurality of clock pins, a plurality of weight values are set between any of the clock pins, the clock data processing system includes a data storage unit and a processor. The data storage unit is configured for storing the clock pins and the weight values. The processor is electrically coupled to the data storage unit and is configured for establishing a graph model and utilizing a force directed algorithm to calculate a branch position according to the weight values and a position of the clock pins. The processor is configured for setting a guide buffer in the branch position and updating a netlist, and performing a clock tree synthesis (CTS) and executing a post-CTS static timing analysis (STA). The processor is configured for determining whether an analysis result of the post-CTS STA meets the setup time constraint, if not, re-calculating the weight values, and re-establishing a graph model according to the weight values; wherein the graph model comprises a plurality of nodes and a plurality of edges, the nodes are corresponded to the clock pins and the edges are corresponded to the weight values.

Another aspect of the disclosure is to provide a computer readable storage medium. is configured for loading in a computer system, and calculating a branch position of a clock tree, the clock tree comprises a plurality of clock pins, a plurality of weight values are set between any of the clock pins, the computer program is configured for performing a computer executing method, wherein the computer executing method includes operations of: establishing a graph model, wherein the graph model comprises a plurality of nodes and a plurality of edges, the nodes are corresponded to the clock pins and the edges are corresponded to the weight values; utilizing a force directed algorithm to calculate a branch position according to the weight values and a position of the clock pins; setting a guide buffer in the branch position and updating a netlist; performing a clock tree synthesis (CTS) and executing a post-CTS static timing analysis (STA); determining whether an analysis result of the post-CTS STA meets the setup time constraint or not; and if the analysis result does not meet the timing setup time constraint, re-calculating the weight values, and re-establishing a graph model according to the weight values.

Based on aforesaid embodiments, the computer executing method, the clock data processing system and the computer readable storage medium are capable of calculating the optimal branch position and setting the guide buffer in the branch position to solve the problem of early branch and detour. It mainly utilized the optimal branch position to extend the common path of the clock pins, and the branch path between the branch position and clock pins are similar, thus achieving the effect of reducing the on-chip-variation in the clock tree.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
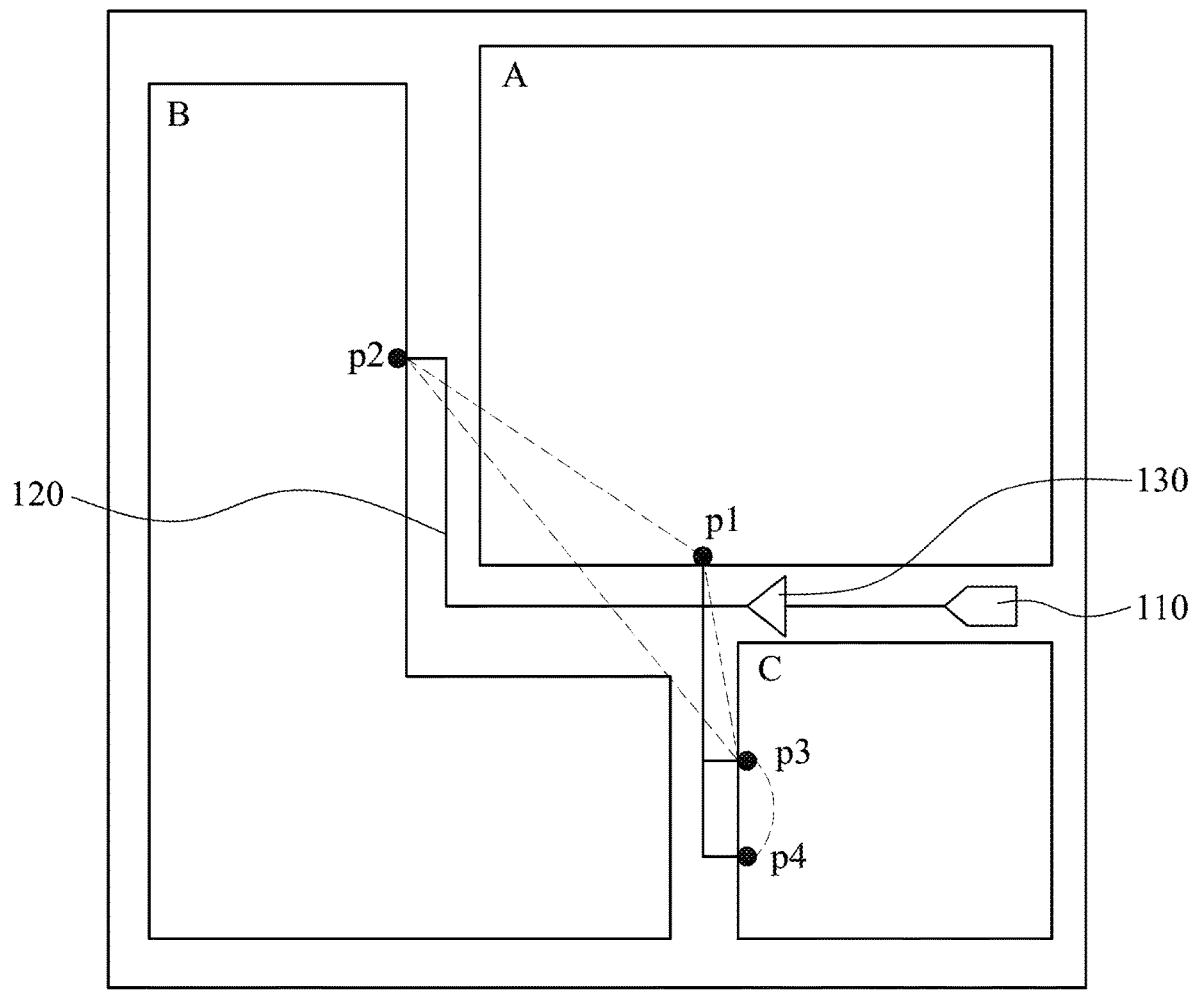
FIG. 1 is a schematic diagram illustrating a clock tree circuit according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating a clock tree circuit 100 according to an embodiment of the disclosure. As shown in FIG. 1, the clock tree circuit 100 includes a clock source 110, a plurality of clock pins p1, p2, p3 and p4, a clock tree layout circuit 120 and a guide buffer 130. The clock tree layout circuit 120 is configured to connected the clock source 110 and the clock pins p1, p2, p3 and p4. The guide buffer 130 is disposed on a branch position of the clock tree layout circuit 120, the branch position is determined based on a plurality of weight values and the position of clock pins p1, p2, p3 and p4, each dash line correspond to one weight value.

Figure 2:
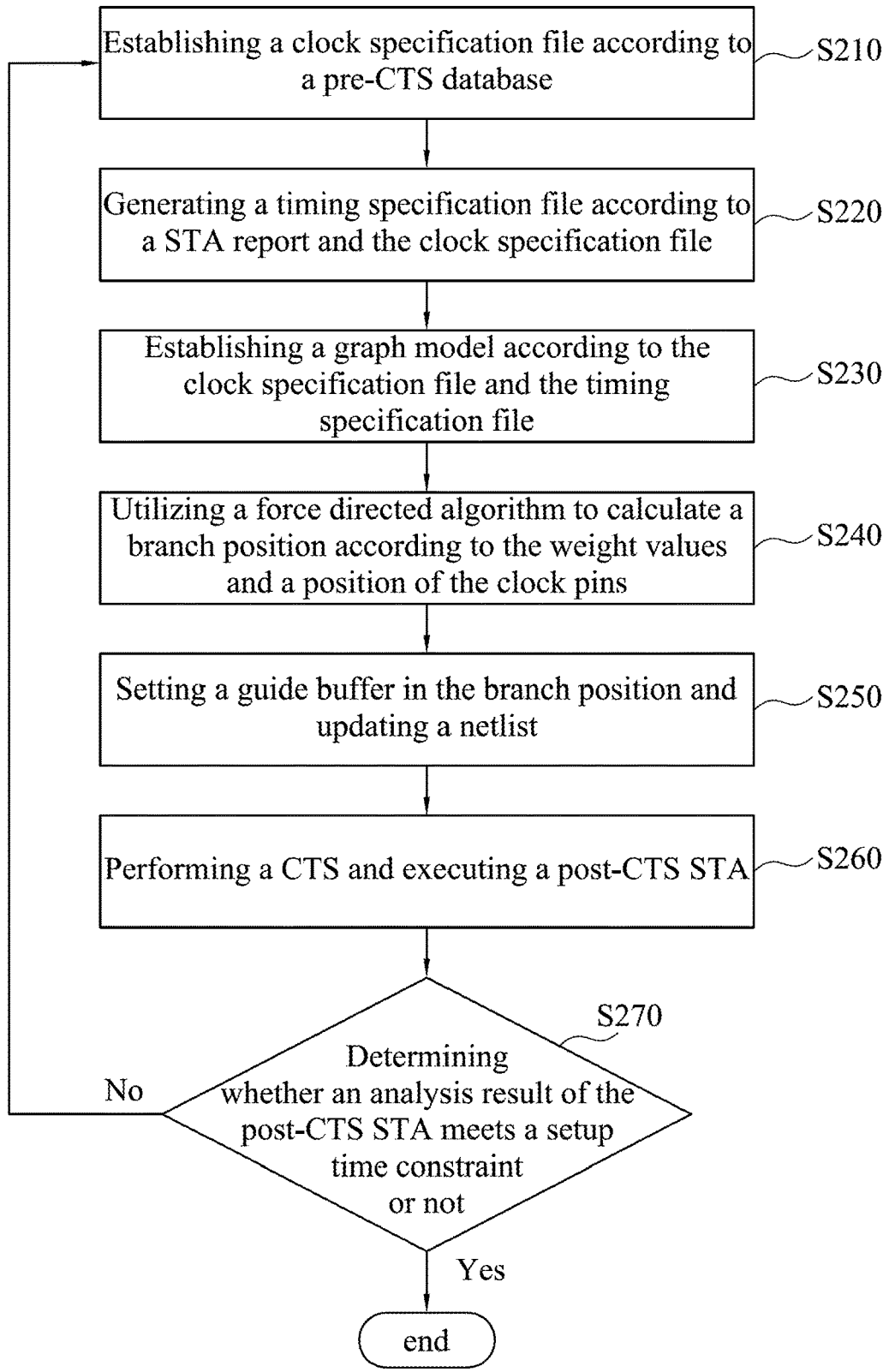
FIG. 2 is a flow diagram illustrating a computer executing method according to an embodiment of this disclosure.

Reference is made to both FIG. 1 and FIG. 2. FIG. 2 is a flow diagram illustrating a computer executing method 200 according to an embodiment of this disclosure. The computer executing method 200 can be applied to the clock tree circuit 100; the branch position set by the guide buffer 130 is determined by the computer executing method 200.

As show in FIG. 2, the computer executing method 200 firstly executes step S210 and step S220 to establish a clock specification file according to a pre-CTS database and to generate a timing specification file according to a STA report and the clock specification file. In the embodiment, firstly, a parser can be utilized to interpret pre-layout STA results, and to generate the timing specification file according to the pre-layout STA report and the clock specification file. As shown in FIG. 1, the clock specification file includes the connected relationship between the clock source 110 and each of the clock pins p1, p2, p3 and p4. The timing specification file includes the data path in which between clock pins p1, p2, p3, and p4, those skilled in the art should also know that the data path can be the timing path (the dashed lines in FIG. 1), the functions represented by the data path and the timing path are the same in the present invention.

Figure 3:
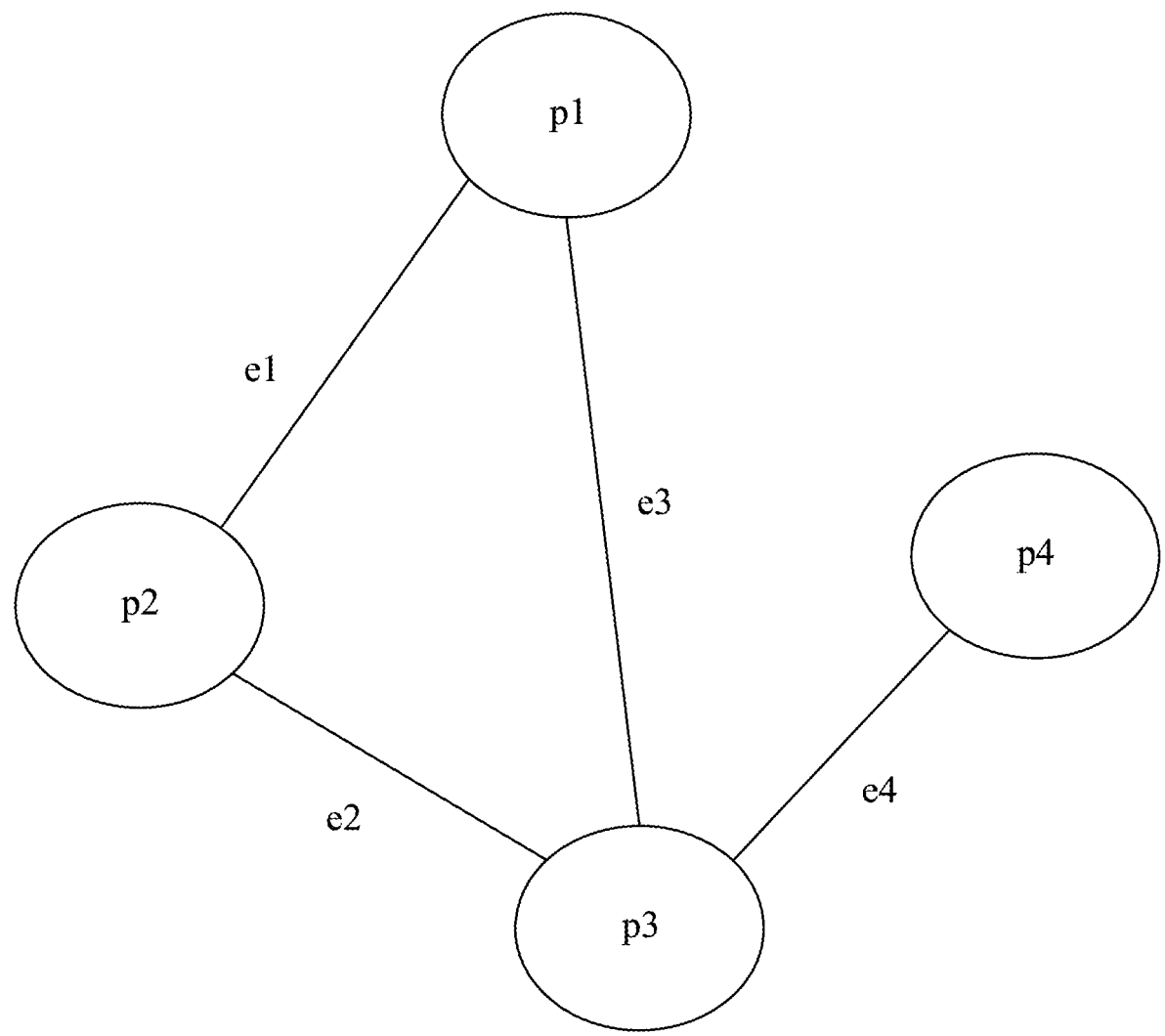
FIG. 3 is a schematic diagram illustrating a graph model.

Afterward, the computer executing method 200 executes step S230 to establish a graph model according to the clock specification file and the timing specification file. Reference is made to FIG. 1 and FIG. 3. FIG. 3 is a schematic diagram illustrating a graph model. As shown in FIG. 3, the graph model includes a plurality of nodes and a plurality of edges e1, e2, e3 and e4, the nodes are the clock pins p1, p2, p3 and p4 in FIG. 1, the edge is represented by the timing path between the clock pins (the dashed lines in FIG. 1), it is represented that the timing relationship between the clock pins.

In the embodiment, a plurality of weight values is set between any of the clock pins, the weight values are used in the following calculations. The weight values can be represented by two types of value, one is a number of the data path between the blocks, and another is a slack value of the data path between the blocks. For example, reference is made to FIG. 1, if there is the data path between the sub-block of block A and sub-block of block B, the number of the data path can be represented by the weight value between clock pins p1 and p2, it means that the number of data paths is greater, the weight value is higher. The slack value is the difference between the required time and arrival time, the required time represents the clock to traverse through clock path, and the arrival time represents the time required for data to travel through data path. In general case, the arrival time of the clock signal is represent as a reference time, and the time delay of all of the unit are calculated in the data path. If the slack value of one of the data path is positive, it represents that the time delay of data path has more margin. If the slack value of one of the data path is negative, it represents the data path doesn't achieve the constrained frequency and timing, and this is called as setup violation. Therefore, the weight values is represented by the negative slack values, if the weight values is higher, the negative slack value is smaller.

Afterward, the computer executing method 200 executes step S240 to utilize a force directed algorithm to calculate a branch position according to the weight values and a position of the clock pins. In the embodiment, the branch position could be calculated by Formula 1, $P_x$ and $P_y$ are represented by the coordinate of the branch position, $n_i$ is represented by the nodes of the graph model, $e_j$ is represented by the edges of the graph model, i is represented by the index of nodes, j is represented by the index of edges, S is represented by the set of nodes and edges in the graph model, $x_i$ and $y_i$ are represented by the coordinate of one of the nodes, and $w_j$ is represented by the weight value of the edges.

$$P_x = \frac{\sum_{n_i, e_j \in S} x_i w_j}{\sum_{n_i, e_j \in S} w_j}, \quad \text{(Formula 1)}$$

$$P_y = \frac{\sum_{n_i, e_j \in S} y_i w_j}{\sum_{n_i, e_j \in S} w_j}$$

In another embodiment, the branch position could be calculated by Formula 2, $P_x$ and $P_y$ are represented by the coordinate of the branch position, $n_i$ is represented by the nodes of the graph model, $e_j$ is represented by the edges of the graph model, i is represented by the index of nodes, j is represented by the index of edges, S is represented by the set of nodes and edges in the graph model, $x_i$ and $y_i$ are represented by the coordinate of one of the nodes, $x_j$ and $y_j$ are represented by the coordinate of one of the edges, $w_i$ is represented by the weight value of the nodes, and $w_j$ is represented by the weight value of the edges.

$$P_x = \frac{\sum_{n_i \in S} x_i w_i + \sum_{e_j \in S} x_j w_j}{\sum_{n_i \in S} w_i + \sum_{e_j \in S} w_j}, \quad \text{(Formula 2)}$$

$$P_y = \frac{\sum_{n_i \in S} y_i w_i + \sum_{e_j \in S} y_j w_j}{\sum_{n_i \in S} w_i + \sum_{e_j \in S} w_j}$$

Figure 4A:
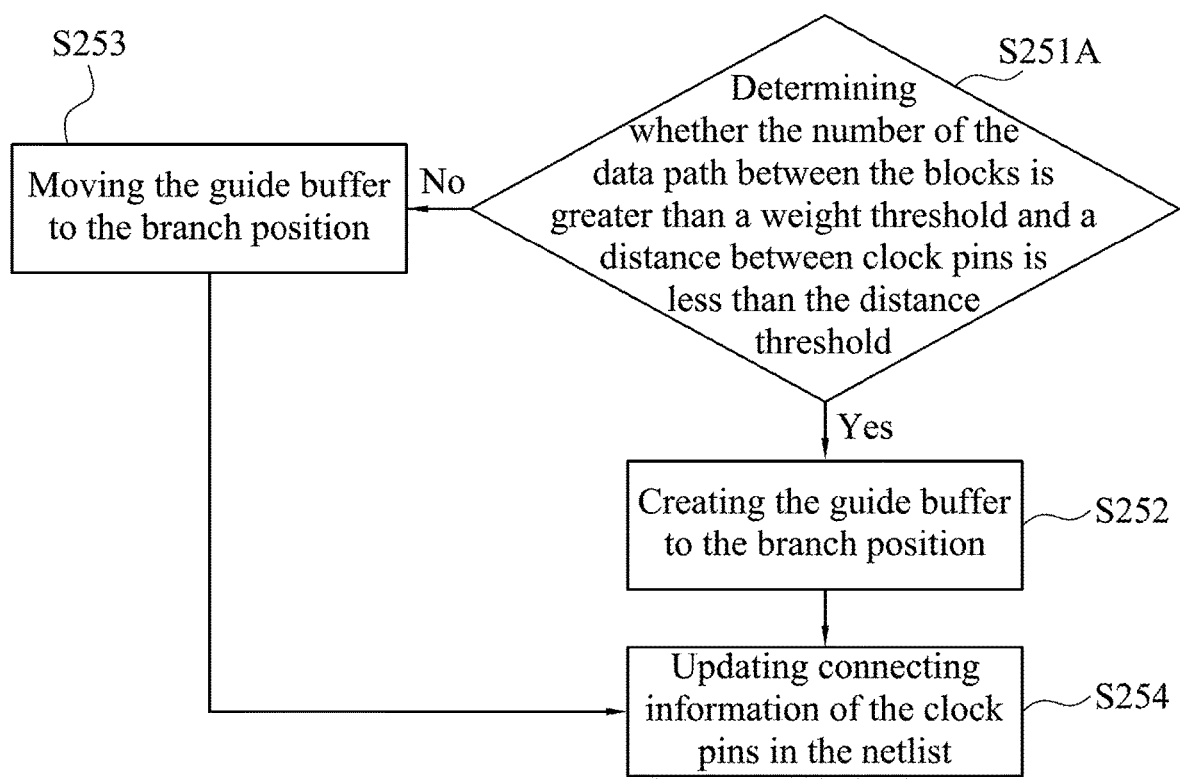
FIG. 4A is a flow diagram illustrating an operation of the computer executing method according to an embodiment of the disclosure.
Figure 4B:
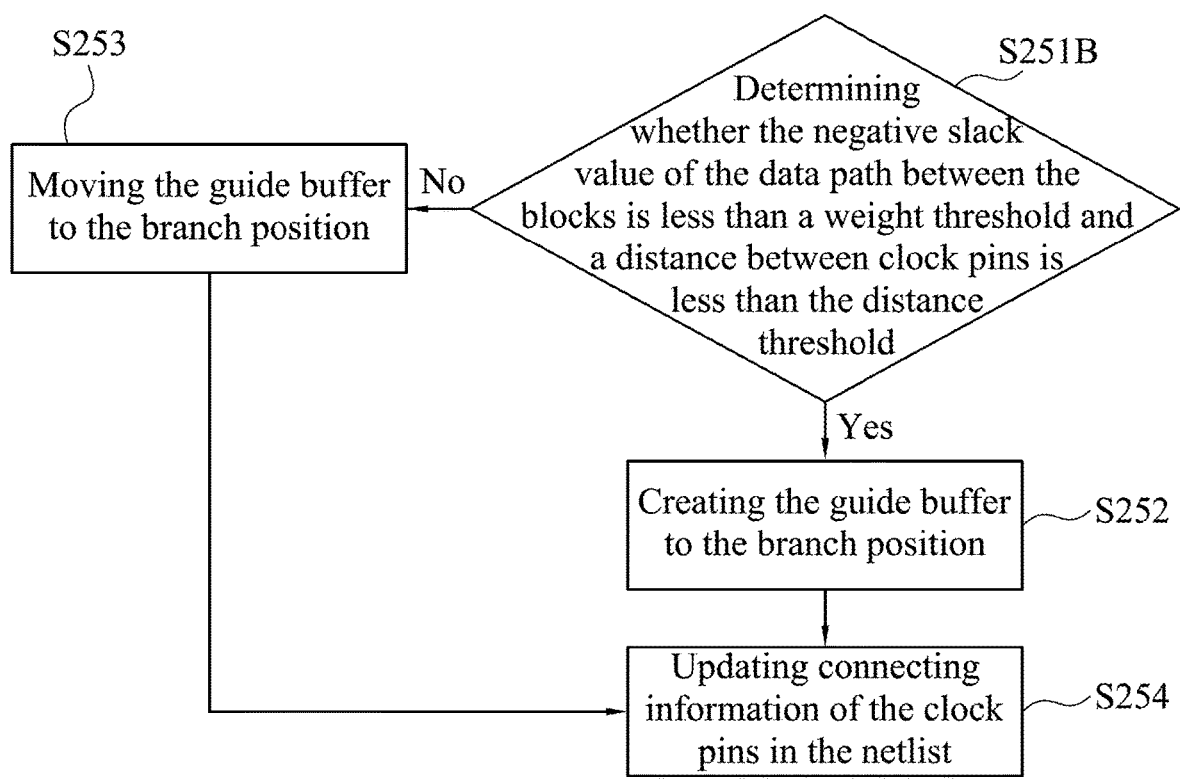
FIG. 4B is a flow diagram illustrating an operation of the computer executing method according to another embodiment of the disclosure.

Afterward, the computer executing method 200 executes step S250 to set a guide buffer in the branch position and updating a netlist. Reference is made to FIG. 4A and FIG. 4B. FIG. 4A is a flow diagram illustrating an operation of the computer executing method according to an embodiment of the disclosure, and FIG. 4B is a flow diagram illustrating an operation of the computer executing method according to another embodiment of the disclosure. As show in FIG. 4A, the step 250A includes following steps S251A~S254. For example, when the number of the data path between the blocks are utilized to the weight values, the computer executing method 200 executes step S251A for determining whether the number of the data path between the blocks is greater than a weight threshold and a distance between clock pins is less than the distance threshold. If the number of the data path between the blocks is greater than the weight threshold and the distance between clock pins is less than the distance threshold, it represents that there is more data passing between the blocks and there is longer distance between clock pins. Afterward, the computer executing method 200 executes step S252 to create the guide buffer to the branch position. If the number of the data path between the blocks is less than the weight threshold or the distance between clock pins is greater than the distance threshold, the computer executing method 200 executes step S253 to move the guide buffer to the branch position. The computer executing method 200 further executes step S254 to update connecting information of the clock pins in the netlist.

In another embodiment, as show in FIG. 4B, the step 250B includes following steps S251B~S254. For example, when the slack value of the data path between the blocks are utilized to the weight values, the computer executing method 200 executes step S251B for determining whether the negative slack value of the data path between the blocks is less than a weight threshold and a distance between clock pins is less than the distance threshold, if the negative slack value of the data path between the blocks is less than the weight threshold and the distance between clock pins is less than the distance threshold, it represents that the time delay of the data path is larger and there is longer distance between clock pins. Afterward, the computer executing method 200 executes step S252 to create the guide buffer to the branch position. If the negative slack value of the data path between the blocks is greater than the weight threshold or the distance between clock pins is greater than the distance threshold, the computer executing method 200 executes step S253 to move the guide buffer to the branch position. The computer executing method 200 further executes step S254 to updating connecting information of the clock pins in the netlist. Besides, when the step S254 is executed, it is necessary to determine whether the position of the guide buffer satisfies the design requirement, if the position of the guide buffer does not satisfy the design requirement, the position of the guide buffer should be re-disposed.

In the embodiment, the selection of the weight values will be adjusted according to the number of the clock tree synthesis, if the clock tree synthesis is performed for the first time, since only the pre-layout STA result is available, and there is only a rough estimate of the slack value. Therefore, in first time the clock tree synthesis, the number of the data path between the blocks are utilized to the weight values, the number of the data path between the blocks will be more accurate relative to the slack value. If the clock tree synthesis has been performed, the post-CTS STA results are available, and the slack value calculated by the post-CTS STA results is more precisely. Therefore, in second time the clock tree synthesis, the slack value of the data path between the blocks are utilized to the weight values, the slack value will be more accurate relative to the number of the data path between the blocks.

Furthermore, the edges of the graph model not only represent the timing relationships between the clock pins, but also could represent the weight values. If there is a high weight value between two clock pins, the timing path between the two clock pins may be the critical path, and it means that the timing path has the maximum time delay. The weight value of the graph model is same as aforesaid weight value, the number of the data path between the blocks are utilized to the weight values in first time establishing the graph model; after executing the post-CTS STA, the slack value of the data path between the blocks are utilized to the weight values.

Afterward, the computer executing method 200 executes step S260 and step S270 to perform a CTS and executing a post-CTS STA, and to determine whether an analysis result of the post-CTS STA meets a setup time constraint or not. If the analysis result of the post-CTS STA does not meet the setup time constraint, it is necessary to re-calculate the weight value and re-execute step S210 and step S220 to generate new clock specification file and new timing specification file, and re-establish the graph model according to the weight value. Since the netlist is updated in step S250, the CTS is performed according to the clock specification file generated by the updated netlist.

Figure 5A:
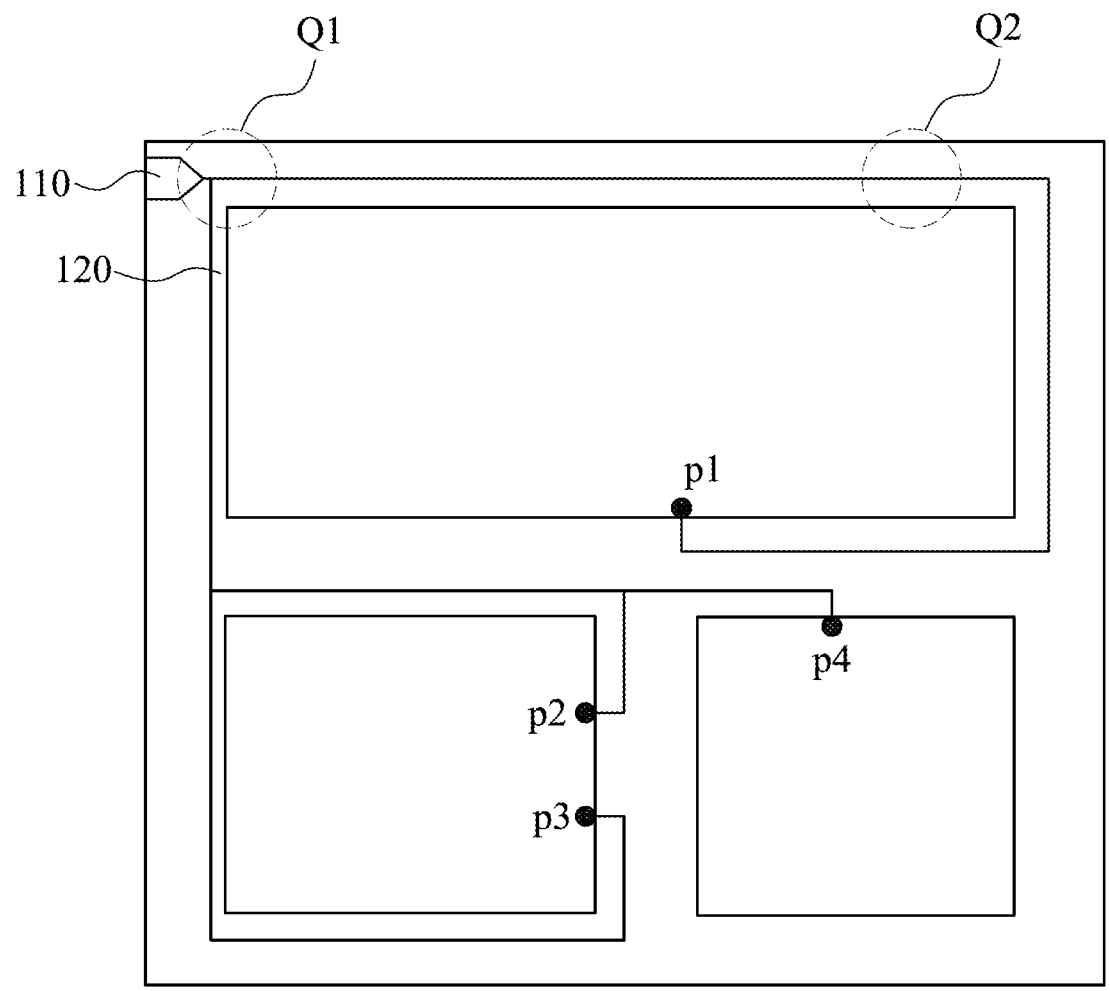
FIG. 5A is a schematic diagram illustrating a clock tree circuit according to an embodiment of the disclosure.
Figure 5B:
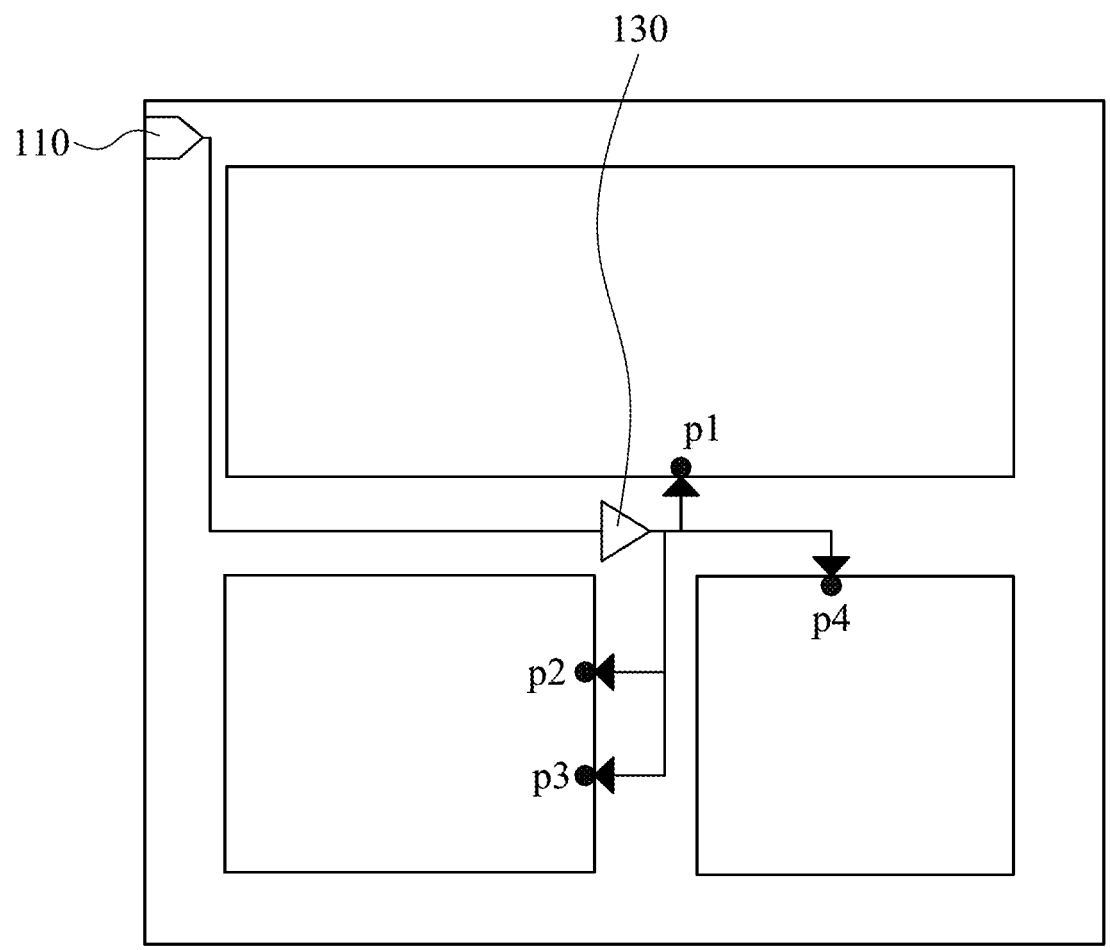
FIG. 5B is a schematic diagram illustrating a clock tree circuit according to an embodiment of the disclosure.

Reference is made to FIG. 5A and FIG. 5B. FIG. 5A is a schematic diagram illustrating a clock tree circuit according to an embodiment of the disclosure, and FIG. 5B is a schematic diagram illustrating a clock tree circuit according to an embodiment of the disclosure. As shown in FIG. 5A, the clock source 110 is connected to the clock pins p1, p2, p3 and p4 via the clock tree layout circuit 120. In the clock tree circuit of FIG. 5A, there are the problems of early branch (dashed area Q1) and detour (dashed area Q2), the problems could easily lead to OCV. Therefore, this disclosure is configured to dispose a guide buffer in a better position, and it will help to solve the problem of early branch and detour. As shown in FIG. 5B, after the calculation of aforesaid computer executing method 200, the branch position can be calculated and disposed in the guide buffer 130 so that the common path between the clock pins p1, p2, p3 and p4 becomes longer, it will reduce the on-chip-variation in the clock tree.

Figure 6:
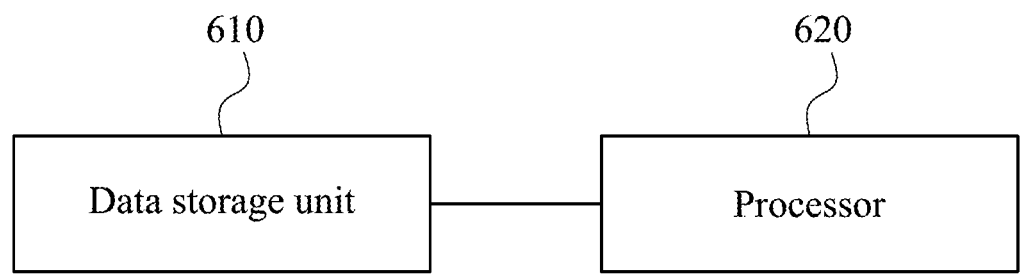
FIG. 6 is a schematic diagram illustrating a clock data processing system according to an embodiment of the disclosure.

In another embodiment, reference is made to FIG. 6, which is schematic diagram illustrating a clock data processing system 600 according to an embodiment of the disclosure. As shown in FIG. 6, clock data processing system 600 includes a data storage unit 610 and a processor 620. The data storage unit 610 is electrically connected to the processor 620. The data storage unit 610 is configured for storing the pre-CTS database and the STA report. The processor 620 is configured for calculating the branch position of the clock tree circuit according to aforesaid computer executing method 200, and may not be addressed in details.

In another embodiment, the disclosure is a computer readable storage medium. The computer readable storage medium stores computer programs, the computer program is configured for loading in a computer system, and calculating the branch position of the clock tree for performing aforesaid computer executing method 200, and may not be addressed in details.

According to the embodiment of the present disclosure, it is understood that the embodiment of the present disclosure is to provide the computer executing method, the clock data processing system and the computer readable storage medium are utilized the weight value to increase the influence of the data path with more timing relationships, so that it is capable of calculating the optimal branch position according to the weight value and setting the guide buffer in the branch position to solve the problem of early branch and detour. It mainly utilized the optimal branch position to extend the common path of the clock pins, and the branch path between the branch position and clock pins are similar, thus achieving the effect of reducing the on-chip-variation in the clock tree.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer executing method, configured for calculating a branch position of a clock tree, the clock tree comprises a plurality of clock pins, a plurality of weight values are set between any of the clock pins, the computer executing method comprising:
    establishing a graph model, wherein the graph model comprises a plurality of nodes and a plurality of edges, the nodes are corresponded to the clock pins and the edges are corresponded to the weight values;
    utilizing a force directed algorithm to calculate a branch position according to the weight values and a position of the clock pins;
    setting a guide buffer in the branch position and updating a netlist;
    performing a clock tree synthesis (CTS) and executing a post-CTS static timing analysis (STA);
    determining whether an analysis result of the post-CTS STA meets a setup time constraint or not; and
    if the analysis result does not meet the setup time constraint, re-calculating the weight values, and re-establishing a graph model according to the weight values.

2. The computer executing method of claim 1, further comprising:
    establishing a clock specification file according to a pre-CTS database; and
    generating a timing specification file according to a STA report and the clock specification file;
    wherein the clock specification file comprises a plurality of blocks, and the blocks comprise the clock pins and a clock source; the timing specification file comprises a data path, the data path is between any two clock pins.

3. The computer executing method of claim 2, wherein the weight values comprise a number of the data path between the blocks, and a slack value of the data path between the blocks.

4. The computer executing method of claim 3, wherein the number of the data path between the blocks are utilized to the weight values in first time establishing the graph model; after executing the post-CTS STA, the slack value of the data path between the blocks are utilized to the weight values.

5. The computer executing method of claim 4, wherein setting the guide buffer in the branch position and updating the netlist, further comprising:
    if the weight values is greater than a weight threshold and a distance between clock pins is less than a distance threshold, creating the guide buffer to the branch position;
    if not, moving the guide buffer to the branch position; and
    updating connecting information of the clock pins in the netlist.

6. The computer executing method of claim 4, wherein setting the guide buffer in the branch position and updating the netlist, further comprising:
    if the weight values is less than a weight threshold and a distance between clock pins is less than a distance threshold, creating the guide buffer to the branch position;
    if not, moving the guide buffer to the branch position; and
    updating connecting information of the clock pins in the netlist.

7. The computer executing method of claim 2, wherein generating the timing specification file according to a pre-layout STA result in first time executing the CTS; generating the timing specification file according to the STA report after executing the post-CTS STA.

8. A clock data processing system, configured for calculating a branch position of a clock tree, the clock tree comprises a plurality of clock pins, a plurality of weight values are set between any of the clock pins, the clock data processing system comprising:
    a data storage unit, configured for storing the clock pins and the weight values; and
    a processor, electrically coupled to the data storage unit, and configured for establishing a graph model and utilizing a force directed algorithm to calculate a branch position according to the weight values and a position of the clock pins; the processor is configured for setting a guide buffer in the branch position and updating a netlist, and performing a clock tree synthesis (CTS) and executing a post-CTS static timing analysis (STA); the processor is configured for determining whether an analysis result of the post-CTS STA meets a setup time constraint or not, if not, re-calculating the weight values, and re-establishing a graph model according to the weight values;

wherein the graph model comprises a plurality of nodes and a plurality of edges, the nodes are corresponded to the clock pins and the edges are corresponded to the weight values.

9. The clock data processing system of claim 8, wherein the data storage unit is configured for storing a pre-CTS database and a STA report; the processor is configured for establishing a clock specification file according to the pre-CTS database, and generating a timing specification file according to the STA report and the clock specification file;

wherein the clock specification file comprises a plurality of blocks, and the blocks comprise the clock pins and a clock source; the timing specification file comprises a data path, the data path is between any two clock pins.

10. The clock data processing system of claim 9, wherein the weight values comprise a number of the data path between the blocks, and a slack value of the data path between the blocks.

11. The clock data processing system of claim 10, wherein the number of the data path between the blocks are utilized to the weight values in first time establishing the graph model; after executing the post-CTS STA, the slack value of the data path between the blocks are utilized to the weight values.

12. The clock data processing system of claim 11, the processor is configured for setting the guide buffer in the branch position and updating the netlist, the processor is further executing following operations:

if the weight values is greater than a weight threshold and a distance between clock pins is less than a distance threshold, creating the guide buffer to the branch position;

if not, moving the guide buffer to the branch position; and updating connecting information of the clock pins in the netlist.

13. The clock data processing system of claim 11, the processor is configured for setting the guide buffer in the branch position and updating the netlist, the processor is further executing following operations:

if the weight values is less than a weight threshold and a distance between clock pins is less than a distance threshold, creating the guide buffer to the branch position;

if not, moving the guide buffer to the branch position; and updating connecting information of the clock pins in the netlist.

14. The clock data processing system of claim 9, wherein generating the timing specification file according to a pre-layout STA result in first time executing the CTS; generating the timing specification file according to the STA report after executing the post-CTS STA.

15. A computer readable storage medium storing a computer program, the computer program is configured for loading in a computer system, and calculating a branch position of a clock tree, the clock tree comprises a plurality of clock pins, a plurality of weight values are set between any of the clock pins, the computer program is configured for performing a computer executing method, wherein the computer executing method comprises:

establishing a graph model, wherein the graph model comprises a plurality of nodes and a plurality of edges, the nodes are corresponded to the clock pins and the edges are corresponded to the weight values;

utilizing a force directed algorithm to calculate a branch position according to the weight values and a position of the clock pins;

setting a guide buffer in the branch position and updating a netlist;

performing a clock tree synthesis (CTS) and executing a post-CTS static timing analysis (STA);

determining whether an analysis result of the post-CTS STA meets a setup time constraint or not; and if the analysis result does not meet the setup time constraint, re-calculating the weight values, and re-establishing a graph model according to the weight values.

16. The computer readable storage medium of claim 15, further comprising:

establishing a clock specification file according to a pre-CTS database; and generating a timing specification file according to a STA report and the clock specification file;

wherein the clock specification file comprises a plurality of blocks, and the blocks comprise the clock pins and a clock source; the timing specification file comprises a data path, the data path is between any two clock pins;

wherein generating the timing specification file according to a pre-layout STA result in first time executing the CTS; generating the timing specification file according to the STA report after executing the post-CTS STA.

17. The computer readable storage medium of claim 16, wherein the weight values comprise a number of the data path between the blocks, and a slack value of the data path between the blocks.

18. The computer readable storage medium of claim 17, wherein the number of the data path between the blocks are utilized to the weight values in first time establishing the graph model; after executing the post-CTS STA, the slack value of the data path between the blocks are utilized to the weight values.

19. The computer readable storage medium of claim 18, wherein setting the guide buffer in the branch position and updating the netlist, further comprising:

if the weight values is greater than a weight threshold and a distance between clock pins is less than a distance threshold, creating the guide buffer to the branch position;

if not, moving the guide buffer to the branch position; and updating connecting information of the clock pins in the netlist.

20. The computer readable storage medium of claim 18, wherein setting the guide buffer in the branch position and updating the netlist, further comprising:

if the weight values is less than a weight threshold and a distance between clock pins is less than a distance threshold, creating the guide buffer to the branch position;

if not, moving the guide buffer to the branch position; and updating connecting information of the clock pins in the netlist.

* * * * *